United States Patent [19]

Albertz et al.

[11] Patent Number: 4,651,572

[45] Date of Patent: Mar. 24, 1987

[54] VENTURI TUBE

[75] Inventors: Theodor Albertz, Kirchhellen; Hans-Richard Baumann, Essen-Bredeney; Gerhard Winkler, Essen, all of Fed. Rep. of Germany

[73] Assignee: Krupp-Koppers GmbH, Essen, Fed. Rep. of Germany

[21] Appl. No.: 825,242

[22] Filed: Feb. 3, 1986

[30] Foreign Application Priority Data

Feb. 20, 1985 [DE] Fed. Rep. of Germany ....... 3505833

[51] Int. Cl.⁴ .......................... G01F 1/44; G01L 19/00
[52] U.S. Cl. ................................... 73/861.63; 73/706; 73/756
[58] Field of Search ................ 73/756, 861.63, 861.52, 73/861.42, 861.64, 706, 716

[56] References Cited

U.S. PATENT DOCUMENTS 4,480,947 11/1984 Nagasaka .......................... 73/861.52
4,507,971 3/1985 Vachek ................................. 73/756

Primary Examiner—Donald O. Woodiel
Attorney, Agent, or Firm—Michael J. Striker

[57] ABSTRACT

A Venturi tube which is especially suited for the differential pressure measurement of flowing gas/particulate material media with high dust loading at temperatures exceeding 100° C. and at elevated pressures includes a pressure-resistant metallic jacket and an inner lining of wear-resistant porous material which is accommodated in the jacket and bounds a flow-through passage with the Venturi configuration. Respective annular chambers are situated at the inlet region and at the smallest-diameter region of the flow-through passage, there annular chambers being separated from the flow-through passage by respective layers of wear-resistant porous material and being connected by respective pulse conduit with a differential pressure measuring device.

8 Claims, 1 Drawing Figure

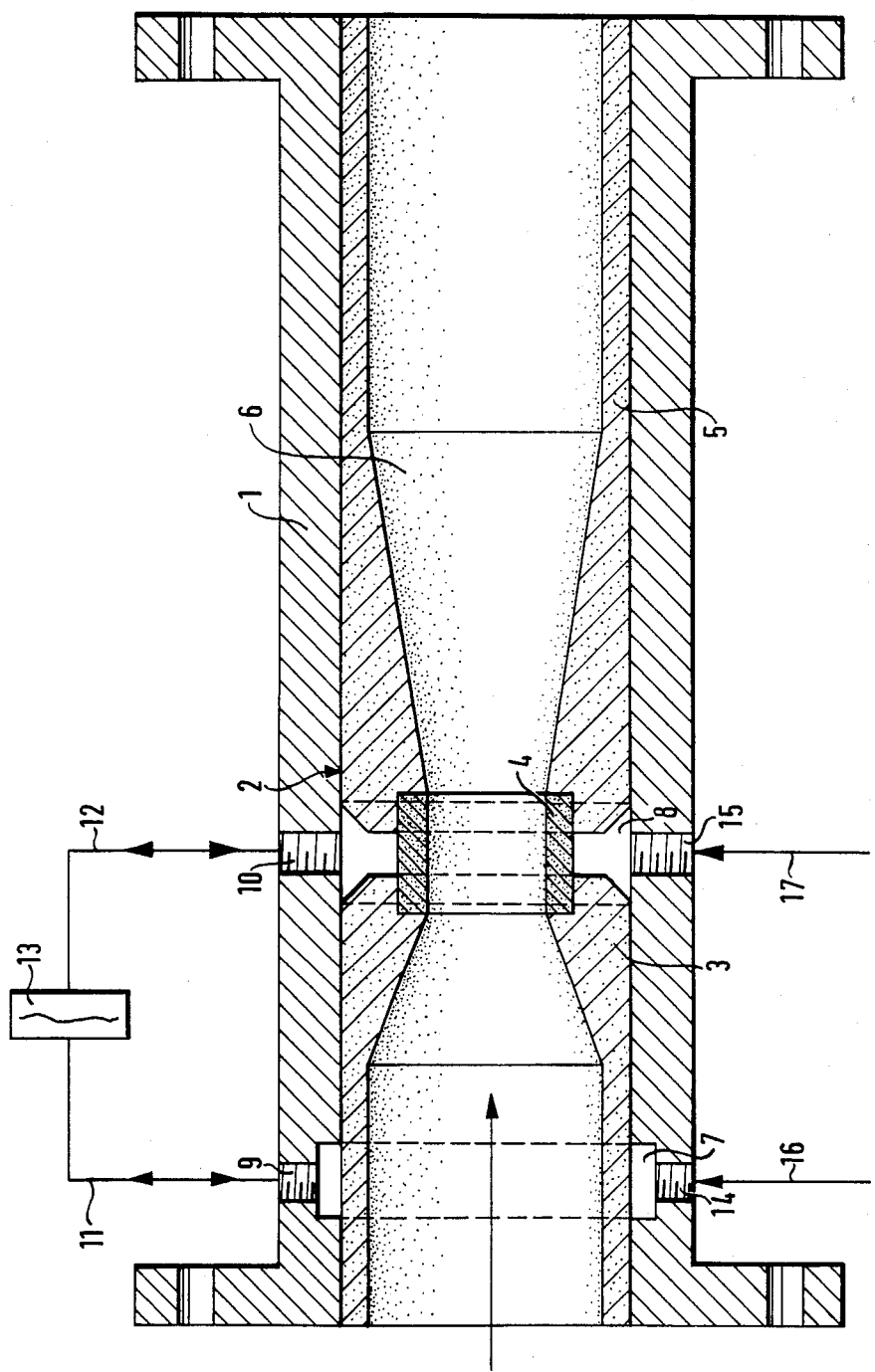

VENTURI TUBE

BACKGROUND OF THE INVENTION

The present invention relates to Venturi tubes in general, and more particularly to a Venturi tube which is particularly suited for the differential pressure measurement in flowing gas/particulate material media with high dust loading at temperatures in excess of 100° C. and at elevated pressures.

During the performance of pressure measurements and differential pressure measurements in conduits or containers through which gases with high dust loading flow of through which a finely granular to pulverulent particulate material is pneumatically conveyed by a carrier gas, problems are encountered time and time again. Herein, the encountered disturbances are predominantly attributable to the deposition of dust on the measuring surfaces of the measuring apparatus being used, in the pressure measuring chambers themselves, or in the pulse conduits between the dust-conveying conduit and the pressure measuring apparatus. As a result of the deposition of dust in the pulse conduits, the measuring apparatus can be often put out of operation after only a short period of use.

A measurement problem of the above kind, during which the aforementioned difficulties can occur, comes into existence in practical application for instance during the measurement and supervision of the mass flow of a finely granular to pulverulent solid fuel which is pneumatically conveyed by means of a carrier gas from a storage bin to a gasification arrangement or plant in which the solid fuel is gasified by partial oxidation with oxygen. In this context, it is desired that the proportion of the carrier gas needed for the pneumatic conveyance be as low as possible. So, for instance, according to a method described in U.S. Pat. application Ser. No. 571,518, the fuel/gas mass flow which is supplied through a pneumatic conduit to the gasification plant is measured and supervised with the aid of a radiometric density measurement as well as a differential pressure measurement at a Venturi tube while utilizing a process computer. This particular process, like the other known processes of this kind, suffers of the above-mentioned problems.

SUMMARY OF THE INVENTION

Accordingly, it is a general object of the present invention to avoid the disadvantages of the prior art.

More particularly, it is an object of the present invention to provide a Venturi tube arrangement which does not possess the disadvantages of the known arrangements of this kind.

Still another object of the present invention is so to construct the arrangement of the type here under consideration as to be particularly suited for the performance of differential pressure measurements on gas/particulate material media flows with high dust loading at temperatures exceeding 100° C. and at elevated pressures.

It is yet another object of the present invention to develop an arrangement of the above type which is, for all intents and purposes, immune to the deleterious influence of entrained particulate material.

A concomitant object of the present invention is so to design the arrangement of the above type as to be relatively simple in construction, inexpensive to manufacture, easy to use, and reliable in operation nevertheless.

In pursuance of these objects and others which will become apparent hereafter, one feature of the present invention resides in a Venturi tube arrangement which is especially suited for the differential pressure measurements on flowing gas/particulate material media with high dust loading at temperatures exceeding 100° C. as well as at elevated pressures, comprising a Venturi tube including a pressure-resistant metallic jacket and an inner lining of a wear-resistant porous material accommodated in the interior of said jacket and bounding a Venturi-shaped flowthrough passage of a varying diameter having an inlet region and a smallest-diameter region, the jacket and the lining together bounding at the inlet and smallest-diameter regions respective annular chambers which are separated from the flow-through passage by respective barrier layers of wear-resistant porous material; and pulse conduit means for connecting the annular chambers with a differential pressure measuring device.

The inner lining of the Venturi tube can herein be either of one piece or constituted by several separate parts. Sintered metal or finely porous ceramic materials are to be considered above all for use as the wear-resistant porous material for the inner lining. The selection of the material is influenced, on the one hand, by the corrosion and erosive loading by the gas/particulate material medium flow to be measured under the respectively encountered operating conditions and, on the other hand, as far as the porosity of the material of the inner lining is concerned, by the type of the dust contained in the gas/particulate material medium flow to be measured. In this connection, it is important that the pores of the material of the inner lining be smaller at the region of the barrier layers between the flowthrough passage and the annular chambers than the average particle size of the dust in the gas/particulate material medium flow to be measured. A material which is particularly suited for the fabrication of the inner lining or of the barrier layers therefrom is a sintered metal with a pore width between 1 and 10 $\mu$m and including high-grade steel available under the designation 1.4404 or Hastelloy. Herein, it can be advantageous under certain circumstances to further subject the utilized sintered metal additionally to a surface treatment to improve its wear resistance. Another suitable material for this purpose is a ceramic material on the basis of $Al_2O_3$ with a pore width between 1 and 30 $\mu$m.

According to another advantageous aspect of the present invention, the inner lining may have a different material composition at the smallest-diameter region of the flow-through passage than over the remainder thereof. In this manner, the fact that, as a result of the constriction of the flow through the flow-through passage at the region of the smallest diameter of the latter, the wear effect of the particulate material being conveyed is the highest at this smallest-diameter region can be taken into consideration.

It is further advantageous when both of the annular chambers are connected to a rinsing gas conduit, through which rinsing gas can be periodically introduced into the annular chambers so as to prevent the porous barrier layers which separate the annular chambers from the flow-through passage from becoming clogged, by blowing any deposited dust away from the respective barrier layer.

The novel features which are considered as characteristic of the invention are set forth in particular in the appended claims. The improved Venturi tube itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The sole Figure of the drawing is a longitudinal sectional view of a Venturi tube arrangement of the present invention, in which the inner lining consists of three separate parts.

DETAILED DESCRIPTION OF THE PREFERRED EMBODIMENTS

Referring now to the drawing in detail, it may be seen that it depicts a Venturi tube which is constructed in accordance with the present invention and includes a pressure-resistant metallic jacket 1 and an inner lining 2 which, in the illustrated construction, is assembled from three separate lining parts 3, 4 and 5. The internal configurations of the individual parts 3, 4 and 5 of the inner lining 2 is herein so chosen that they collectively constitute the well known and largely standardized Venturi passage configuration. However, as already mentioned before, the lining 2 could also be made of one piece.

Yet, the illustrated construction of the lining 2 consisting of the three separate lining parts 3, 4 and 5 renders it possible to better accommodate the material composition of the inner lining 2 to the actual conditions or operating parameters of the Venturi tube. So, for instance, in the illustrated construction of the Venturi tube of the present invention, the lining parts 3 and 5 are made of a porous sintered metal, such as of a material known and available under the designation 1.4404, having a pore width of 1 to 10 um, while the lining part 4, which is situated at the region of the smallest diameter of a flow-through passage 6 of the Venturi tube is made of a porous ceramic material on the basis of $Al_2O_3$ with a pore width of 1 to 10 um. In this manner, there is taken into consideration the fact that the erosive effect of a gas/particulate material medium flowing through the flow-through passage 6 in the direction of the illustrated arrow is the highest at this region.

An annular chamber 7 is arranged at the inlet region of the flow-through passage 6 as considered in the direction of the arrow, and another annular chamber 8 is disposed at the region of the flow-through passage 6 which has the smallest diameter. As may be seen in the drawing, each of the two annular chambers 7 and 8 is separated by a barrier layer of a porous wear-resistant material, which forms the inner lining 2 at the region of the respective annular chamber 7 or 8, from the flow-through passage 6. As usual in Venturi tubes, the flow-through passage 6 has a circular cross section. The annular chamber 7 is provided in, preferably milled into, the material of the pressure-resistant metallic jacket 1, while the annular chamber 8 is formed by a hollow space that comes into existence during the assembly of the lining parts 3, 4 and 5 with one another and with the metallic jacket 1. The annular chambers 7 and 8 are connected by respective connecting ports or bores 10 which are provided in the metallic jacket 1 with respective pulse conduits 11 and 12 which lead to a differential pressure measuring device 13. For the sake of clarity and simplicity, these pulse conduits 11 and 12 are illustrated in the drawing merely as solid lines, and the flow direction of the gas through the respective conduit 11 or 12 toward the differential pressure measuring device 13 is indicated by an arrow.

Due to the provision of the respective porous wear-resistant barrier layers between the flow-through passage 6 and the respective annular chambers 7 and 8, only gas free of particulate contaminants enters the annular chambers 7 and 8. Of course, different pressures will build up in the annular chambers 7 and 8, these pressures being respectively proportional to the pressures which instantaneously exist in the stream of the gas/particulate material medium at those regions of the flow-through passage 6 which are associated with the respective annular chambers 7 and 8. The differential pressure which is obtained in this manner can be determined either pneumatically or electrically by means of any commercially available differential pressure measuring devices 13. Herein, the annular chambers 7 and 8 as well as the associated pulse conduits 11 and 12 are to be so dimensioned that they enclose as small a gas volume as possible, so that an as quick as possible pressure equalization can occur between the annular chambers 7 and 8 and the flow-through passage 6 after any change in the pressure of the stream of the gas/particulate material medium at the respective region of the flow-through passage 6, and so that only a minute amount of the gas need be cleaned of the entrained dust or other entrained particles by the porous material of the barrier layer during the passage of such gas through the barrier layer.

The flow speed of the stream of the gas/particulate material medium in the flow-through passage 6 is usually so high that the medium itself provides for a sufficient self-cleaning effect at the side of the barrier layer of porous material which comes into contact with the gas/particulate material medium, and thus prevents a buildup of a filter cake at the respective region of the lining 2. Herein, only a few open pores are needed for the pressure equalization between the flow-through passage 6 and the respective chamber 7 or 8. Nevertheless, it can be provided, in the interest of a maximum operating reliability, that the chambers 7 and 8 be connected to rinsing conduits 16 and 17. In this case, the barrier layer of porous material can be periodically rinsed clean by a relatively small rinsing gas stream and clogging of the barrier layer by fine dust particles can thus be prevented or counteracted.

A rinsing gas connection or arrangement of this type is to be recommended, for instance, when the stream of the gas/particulate material medium contains moist and/or adhesive dust. In contradistinction to the heretofore known arrangements, the rinsing gas stream can be considerably smaller, inasmuch as the speed of flow of the rinsing gas stream in the pulse conduits 11 and 12 does not constitute any limiting value which would have to be watched for the prevention of the entry of dust into the annular chambers 7 and 8. Experience has shown, for instance, that during the sealing stream or flow conveyance of finely granular to pulverulent solid fuel by means of a carrier or entraining gas while using the heretofore known arrangements, there is needed a rinsing gas current pro pulse conduit which amounts to more than 10% by volume of the carrier gas. On the other hand, when the arrangement of the present invention is being used, it is merely necessary to provide an intermittent stream of the rinsing gas amounting to less than 1% by volume of the carrier gas. Naturally, in this construction, the rinsing gas delivery through the two rinsing gas conduits 16 and 17 need not necessarily be the same. The rinsing gas conduits 16 and 17, which are connected with the respective annular chambers 7 and 8 through respective rinsing bores or ports 14 and 15 which are provided in the metallic jacket 1, are indicated in the drawing merely by respective arrows for the sake of clarity.

It will be appreciated that, naturally, the subdivision of the inner lining 2 into its individual constituent parts can also be accomplished in a different manner than it was done in the illustrated exemplary embodiment of the present invention. So, for instance, the barrier layer which is situated in front of the annular chamber 7 can also have a different material composition than the parts 3 and 5 of the inner lining 2 of the Venturi tube. It will also be self-evident that, naturally, it must be provided for a pressure-proof sealing effect between the individual parts, such as 3, 4 and 5, of the inner lining 2, as well as between the inner lining 2 and the metallic jacket 1. This, however, can be achieved by resorting to customary measures, such as the provision of sealing rings at appropriate locations, or the like.

It has been established in practical applications that, when the Venturi tubes constructed in accordance with the present invention have been used for differential pressure measurements of a gas/particulate material mixture which included as the particulate material a pronouncedly erosive finely granular to pulverulent solid fuel and was at a temperature of approximately 400° C. and at a pressure in the vicinity of 50 bar, an unobjectionable operation of the arrangement was assured even after a period of operation amounting to several hundred hours.

It will be understood that each of the elements described above, or two or more together, may also find a useful application in other types of arrangements differing from the type described above.

While the invention has been illustrated and described as embodied in a Venturi tube differential pressure measuring arrangement for gas/solid particulate fuel mixtures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A Venturi tube arrangement which is especially suited for the differential pressure measurements on flowing gas/ particulate material media with high dust loading at temperatures exceeding 100° C. as well as at elevated pressures, comprising a Venturi tube including a pressure-resistant metallic jacket and an inner lining of a wear-resistant porous material accommodated in the interior of said jacket and bounding a Venturi-shaped flowthrough passage of a varying diameter having an inlet region and a smallest-diameter region, said jacket and said lining together bounding at said inlet and smallest-diameter regions respective annular chambers which are separated from said flow-through passage by respective barrier layers of wear-resistant porous material; and pulse conduit means for connecting said annular chambers with a differential pressure measuring device.

2. The arrangement as defined in claim 1, wherein said inner lining is of one piece.

3. The arrangement as defined in claim 1, wherein said inner lining includes at least two separate lining parts.

4. The arrangement as defined in claim 1, wherein said inner lining has a different material composition at said smallest-diameter region than over the remainder thereof.

5. The arrangement as defined in claim 1, wherein said inner lining has a different porosity at said smallest-diameter region than over the remainder thereof.

6. The arrangement as defined in claim 1, wherein said inner lining has a different material composition at a zone of said barrier layer which is juxtaposed with that one of said annular chambers that is situated at said inlet region than over the remainder of said inner lining.

7. The arrangement as defined in claim 1, wherein said inner lining has a different porosity at a zone of said barrier layer which is juxtaposed with that one of said annular chambers that is situated at said inlet region than over the remainder of said inner lining.

8. The arrangement as defined in claim 1, and further comprising rinsing gas supply conduit means connected to said annular chambers.

* * * * *